United States Patent [19]

Smith et al.

[11] 4,393,939

[45] Jul. 19, 1983

[54] CLAY STABILIZATION DURING OIL AND GAS WELL CEMENTING OPERATIONS

[75] Inventors: Charles W. Smith; John K. Borchardt, both of Duncan, Okla.

[73] Assignee: Halliburton Services, Duncan, Okla.

[21] Appl. No.: 255,963

[22] Filed: Apr. 20, 1981

[51] Int. Cl.³ ............................................. E21B 33/138
[52] U.S. Cl. ..................................... 166/293; 106/90; 166/305 R; 405/267
[58] Field of Search .................. 106/90; 166/283, 293, 166/305 R; 405/266, 267

[56] References Cited

U.S. PATENT DOCUMENTS

| | | | |
|---|---|---|---|
| 2,947,360 | 8/1960 | Bernard | 166/305 R |
| 3,094,501 | 6/1963 | Wahl et al. | 166/293 X |
| 3,104,704 | 9/1963 | Kucera et al. | 166/293 |
| 3,578,781 | 5/1971 | Abrams et al. | 166/305 R |
| 3,931,096 | 1/1976 | Guilbault et al. | 166/293 X |
| 3,943,996 | 3/1976 | Guilbault et al. | 166/293 |

FOREIGN PATENT DOCUMENTS

| | | | |
|---|---|---|---|
| 496247 | 3/1976 | U.S.S.R. | 106/90 |
| 541818 | 2/1977 | U.S.S.R. | 106/90 |

*Primary Examiner*—Stephen J. Novosad
*Assistant Examiner*—George A. Suchfield
*Attorney, Agent, or Firm*—G. Keith deBrucky; Thomas R. Weaver

[57] ABSTRACT

A process for treating a subterranean formation with an aqueous cement composition and minimizing damage to formation permeability by said composition filtrate comprising mixing with said composition at least one polycationic polymer having a molecular weight of about 400 to 6,000,000 prior to treating said formation.

24 Claims, No Drawings

CLAY STABILIZATION DURING OIL AND GAS WELL CEMENTING OPERATIONS

SUMMARY OF THE INVENTION

The present invention relates to improved cementing compositions and their use in cementing processes particularly for cementing oil and gass wells penetrating subterranean formations. Particularly the present invention relates to the use of additives to reduce the permeability damage caused by fluid which is lost from the cementing composition and penetrates the subterranean formation. More particularly the present invention relates to the use of certain cationic organic polymers as clay stabilizers in cement compositions to reduce the permeability damage caused by clay swelling and clay particle disintegration and migration due to invasion of the formation by fluid lost from the cement slurry. When this lost fluid contains a cationic organic polymer which functions as a clay stabilizer, clay swelling and disintegration of clay particles is prevented. This prevents reduction in formation permeability and a consequent loss in well productivity.

Polymer compositions have long been used as additives to cementing compositions to reduce water loss. For example U.S. Pat. Nos. 3,943,996 and 3,931,096 disclose the use of methacrylamidopropyltrimethylammonium polymers to reduce the fluid loss from aqueous cement slurries. U.S. Pat. No. 2,614,998 describes the use of alkali metal salts of partially hydrolyzed acrylamide polymers and of polyacrylic acid as fluid loss additives for cement compositions. U.S. Pat. Nos. 3,491,049 and 3,511,314 disclose the use of polyalkylene-polyamines, polyalkylenimines, and of the reaction products of these polymers with acidic compounds as fluid loss additives for aqueous cement slurries. In U.S. Pat. No. 3,359,225 the use of polyvinylpyrrolidone to prevent the separation of free water from cement slurries is described. Additional prior art references are cited below:

| Pat. No. | Inventor | Date Issued |
| --- | --- | --- |
| 3,856,088 | Frisque | December 24, 1974 |
| 4,012,327 | Boothe et al | March 15, 1977 |
| 3,242,986 | Hower | March 29, 1966 |
| 3,271,307 | Dickson | September 6, 1966 |
| 3,287,145 | Fischer | November 22, 1966 |
| 3,500,929 | Eilers et al | March 17, 1970 |
| 2,745,815 | Mussell | May 15, 1956 |
| 3,878,895 | Wieland et al | April 22, 1975 |
| 3,923,100 | Bellos et al | December 2, 1975 |
| 3,254,719 | Root | June 7, 1966 |
| 3,407,878 | Engle | October 29, 1968 |
| 3,979,304 | Fischer et al | September 7, 1976 |
| 3,979,305 | Fischer et al | September 7, 1976 |
| 3,998,773 | Crinkelmeyer | December 21, 1976 |
| 4,024,918 | Crinkelmeyer | May 24, 1977 |

In the prior art discussed above, the fluid loss additive reduces the volume of fluid lost from the cement slurry to the formation but does not completely eliminate fluid loss. The invasion of a formation by a water foreign to the formation can cause clay swelling and/or clay disintegration and migration of fine particles. Either process can cause partial or complete blocking of the capillary flow channels significantly reducing the hydrocarbon productivity of an oil—or gas—bearing formation. McLaughlin et al describes in detail the mechanism of clay—produced permeability damage and the types of clays encountered in subterranean formations in a paper entitled "Aqueous Polymers for Treating Clay in Oil and Gas Producing Formations", SPE Paper No. 6008 presented at the SPE 51st Annual Technical Conference and Exhibition, New Orleans, October 3-6, 1976 (incorporated herein by reference)

The prior art concerning clay stabilization invention is described in references cited and/or discussed herein. Each reference cited or discussed herein is incorporated herein by reference to any extent deemed necessary for any purpose. Other prior art references are cited as follows:

1.-24. 2,761,843; 2,801,984; 2,801,985; 2,940,729; 3,334,689; 3,382,924; 3,419,072; 3,422,890; 3,483,923; 3,494,965; 3,578,781; 3,603,399; 3,625,684; 3,660,431; 3,666,810; 3,738,437; 3,741,307; 3,827,495; 3,827,500; 3,833,718; 3,974,220; 4,069,365; 4,073,763; 4,158,521.
25. Barkman, J. H.; Abrams, A.; Darley, H. C. H.; & Hill, H. J.; "An Oil Coating Process to Stabilize Clays in Fresh Water Flooding Operations," SPE-4786, SPE of AIME Symposium on Formation Damage Control, New Orleans, La. Feb. 7-8, 1974.
26. Coppel, Claude E.; Jennings, Harley X.; & Reed, M. G.; "Field Results From Wells Treated with Hydroxy-Aluminum," JOURNAL OF PETROLEUM TECHNOLOGY (Sept. 1973) pp. 1108–1112.
27. Graham, John W.; Monoghan, P. H.; & Osoba, J. S.; "Influence of Propping Sand Wettability on Productivity of Hydraulically Fractured Oil Wells," PETROLEUM TRANSACTIONS, AIME, Vol. 216 (1959).
28. Hower, Wayne F.; "Influence of Clays on the Production of Hydrocarbons," SPE-4785, SPE of AIME Symposium on Formation Damage Control, New Orleans, La., Feb. 7-8, 1974.
29. Hower, Wayne F.; "Adsorption of Surfactants on Montmorillonite," CLAYS AND CLAY MINERALS, Pergamon Press (1970) Vol. 18, pp. 97–105.
30. Hoover, M. F., & Butler, G. B.; "Recent Advances in Ion-Containing Polymers," J. POLYMER SCI, Symposium No. 45, 1-37 (1974).
31. Jackson, Kern C.; TEXTBOOK OF LITHOLOGY, McGraw-Hill Book Company (1970) (Library of Congress Catalogue Card No. 72-95810) pp. 95–103.
32. Theng, B. K. G.; THE CHEMISTRY OF CLAY-ORGANIC REACTIONS, John Wiley & Sons (1974) (Library of Congress Catalog Card No. 74-12524) pp. 1–16.
33. Veley, C. D.; "How Hydrolyzable Metal Ions Stabilize Clays To Prevent Permeability Reduction," SPE-2188, 43rd Annual Fall Meeting of SPE and AIME, Houston, Texas (Sept. 29–Oct. 2, 1968).
34. Milchem Incorporated, "Milchem's SHALETROL. Sticky Shale Can't Stop You Anymore," DF-5-75 1M.
35. Chemergy Corporation, "Maintain Maximum Production With PermaFIX and PermaFLO Treatments for CLAY/FINE and SAND CONTROL."
36. Williams, L. H. and Underdown, D. R.; "New Polymer Offers Permanent Clay Stabilization Treatment," SPE Paper No. 8797 presented at the SPE of AIME Fourth Symposium on Formation Damage Control, Bakersfield, Ca., Jan. 28-29, 1980.
37. Young, B. M.; McLaughlin, H. C.; and Borchardt, J. K., "Clay Stabilization Agents—Their Effectiveness in High Temperature Steam," *J. Petroleum Technology*, 32, 2121 (1980).

The use of cationic organic polymers as clay stabilizers has been described in the prior art. McLaughlin et al (SPE 6008) describe the use of cationic organic polymer clay stabilizers in gravel packing, hydraulic fracturing, acidizing, sand consolidation, and perforating operations as well as in production wells prior to the onset of water production, water injection wells, and in air or gas and mist or foam drilling and in chemical grouting. U.S. Pat. No. 4,158,521 describes the use of dimethylamine-epichlorohydrin copolymers in perforating and well stimulation operations. Young, McLaughlin, and Borchardt (J. Petroleum Technology, 32, 2121 (1980) describe the use of cationic organic polymer clay stabilizers in steam injection wells.

Theng has noted that clays are composed of crystalline minerals having a layer structure composed of sheets of linked silica $Si(O,OH)_4$ tetrahedra with those of linked $M_{2-3}(OH)_6$ octahedra, where M is either a divalent (e.g., $Mg^{+2}$, $Ca^{+2}$, etc.) or a trivalent (e.g., $Al^{+3}$) metal cation. Condensation in a 1:1 ratio gives rise to the diphorphic clays such as kaolinite having a general layer formula: $M_{2-3}Si_2O_5(OH)_4$. Condensation in a 2:1 ratio gives rise to the trimorphic clays such as smectite having a general layer formula $M_{2-3}Si_4O_{10}(OH)_2$.

Typically, portland cement is manufactured from two parts of crushed limestone and/or oyster shells and/or marl plus 1 part pulverized clay and/or shale and iron ore. The chemical compounds found in set portland cement are summarized below:

| CHEMICAL COMPOUNDS FOUND IN SET PORTLAND CEMENT | | |
|---|---|---|
| Compound | Formula | Standard Designation |
| Tricalcium aluminate | $3CaO.Al_2O_3$ | $C_3A$ |
| Tricalcium silicate | $3CaO.SiO_2$ | $C_3S$ |
| B-dicalcium silicate | $2CaO.SiO_2$ | $C_2S$ |
| Tetracalcium aluminoferrite | $4CaO.Al_2O_3.Fe_2O_3$ | $C_4AF$ |

This table is taken from ASTM Standards, Part III, American Society for Testing Materials, Philadelphia, Pa. (1970).

The compositions and properties of API classes of Portland cement are given below:

| TYPICAL COMPOSITION AND PROPERTIES OF API CLASSES OF PORTLAND CEMENT | | | | | |
|---|---|---|---|---|---|
| API Class | Compounds (percentage) | | | | Wagner Fineness (sq cm/gm) |
|  | $C_2A$ | $C_2S$ | $C_3A$ | $C_4AF$ |  |
| A | 53 | 24 | 8+ | 8 | 1,600 to 1,800 |
| B | 47 | 32 | 5− | 12 | 1,600 to 1,800 |
| C | 58 | 16 | 8 | 8 | 1,800 to 2,200 |
| D & E | 26 | 54 | 2 | 12 | 1,200 to 1,500 |
| G & H | 50 | 30 | 5 | 12 | 1,600 to 1,800 |

This table is taken from "Specifications for Oil-Well Cements and Cement Additives, "API Standards 10A, 19th ed., API, New York (1974).

Both clays and cements contain silica and alumina minerals. McLaughlin noted that when a cationic organic polymer was exposed to a clay surface, treatment of or adsorption onto the clay was practically instantaneous. McLaughlin and co-workers also stressed that the cationic organic polymer treatment solution should be clear, i.e. not contain suspended solids which could adsorb the cationic polymer.

Therefore, it is surprising that when a cement composition is hydrated with a solution containing less than 1% (relative to the weight of the dry cement) cationic organic polymer clay stabilizer, the concentration of the clay stabilizer in the filtrate or fluid lost from the cement slurry into a formation is sufficient to stabilize the clays contracted by this fluid, thus preventing permeability damage to the formation and consequent loss of hydrocarbon productivity or well inactivity; or in other words, a significant quantity of the cationic polymer is not adsorbed by the cement solids but rather a sufficient concentration of cationic polymer remains in the aqueous phase of the slurry and filtrate lost to effectively treat clay in an adjacent formation or earthern bed.

The cationic organic polymer clay stabilizer is compatible with some fluid loss additives, retarders, accelerators, and other additives often used in cement slurries. However, compatibility of the cationic organic polymer with each additive must be individually determined. The cationic organic polymer will normally be incompatible with additives containing anionic groups such as in substantially hydrolyzed polyacrylamides or polyacrylic acid used to reduce the fluid lost from the slurry to adjacent permeable zones or lignosulfonates, often used to retard the setting of cement.

The class of cationic polymers used for the mixtures of this invention comprises organic water soluble polymers with the cationic radical, group or atom being a nitrogen, phosphorous or sulfur atom arranged in the polymer chain, in a pendant portion of the chain or a pendant branch chain with other radicals, atoms or groups attached or associated to make the atom cationic. The cationic polymer preferably has at least one cationic atom for each repeating monomeric or polymer unit; however, the concentration of cationic atoms may be lower. The polymer units containing cationic atoms can be randomly separated by the same type of polymeric unit in which the corresponding atom is not cationic or by different polymeric units. That is the nitrogen, phosphorous or sulfur atom may not be cationic in certain polymer units and the cationic polymer can be a copolymer with more than one type or numerous types of polymeric units linked in a random pattern, in blocks or regular or random pattern or in some regular pattern throughout the polymer chain. These copolymers typically contain 2 or more, e.g. about 2–6 different types of polymer units. They can be produced by initial polymerization of mixtures of monomer units, mixtures of prepolymer molecules, or mixtures of these. Copolymers can also be produced by modification of, substitution on or reaction between compatible substituents and certain polymer units after the polymer chain is formed. The above described class of cationic polymers shall be referred to herein as substantially linear organic cationic polymers.

In the process of filling, sealing or cementing of this invention the organic polycationic polymer is normally water soluble and can be added to the cement slurry in any conventional manner. The organic polymer can be sprayed on or dry blended with dry cement before, with or after other dry ingredients. The organic polymer can be added as a dried particulate material but it is usually handled as an aqueous concentrate. If added to the dry cement as an aqueous concentrate or concentrate in another solvent, it should be sprayed on or thoroughly mixed with the dry ingredients and the amount of any water added should be low to prevent premature hydration or reaction of the cement. The organic polymer can also be mixed with water used to make the cement slurry alone or with other additives. The polymer can also be added to the cement slurry after it is mixed.

The organic polymer is preferably used in the cement slurry in concentrations of about 0.1–20% by weight of the dry cement. The concentration is preferably at least 1.0% by weight of dry cement but can be higher. The maximum concentration is governed only by economics and the degree of clay stabilization desired. The concentration of organic polymer is cement slurry filtrate should be at least about 0.1% by weight of filtrate. This concentration is governed by the initial concentration of polymer in the slurry and the amount absorbed by the cement or other materials present. The above amount of at least about 0.1% of polymer by weight of filtrate lost from the slurry is considered to be an effective amount of organic polymer in the fluid for treating an adjacent clay containing formation. This minimum concentration of organic polymer in the filtrate generally corresponds to a minimum concentration in the aqueous cement slurry of about at least 0.3% or more by weight of the aqueous phase of the cement slurry. This concentration does not include organic polymer which irreversibly reacts with anionic solid or additives in the slurry and is no longer available dispersed in the aqueous fluid or filtrate and to treat clays in adjacent formation. Effective clay treating ability is considered to be a treatment or treating concentration which prevents any substantial reduction in permeability of a clay containing formation which is subjected to flow tests using brine and/or fresh water, especially after treatment with an acidizing fluid. That is effective clay stabilization must be determined as resistance to flow or reduction in permeability under dynamic conditions and not merely by flocculation tests since many additives can be used for flocculating clays but are not effective clay stabilizers.

The cement which the organic polycationic polymers of this invention can be used are generally inorganic cements such as portland, silicate, aluminate, mixtures thereof and similar cements. A preferred class of cement contains a significant amount of portland cement, which class shall be referred to herein as cement or portland cement. Significant amount as defined herein shall mean about 25% or more by weight of solids or the phase being defined and major portion shall mean about 50% or more by weight of solids or the phase being defined. These classes of solids or phases do not include inert or relatively inert additives such as silica, sand, perlite, fly ash, vermiculite, gel (clays such as bentonite), montmorillonite and like such. However, in some cases such additives can be used in combination with other ingredients to produce a supplemental cement system, for example fly ash or other sources of silica and/or alumina can be used with lime to produce a pozzolan cement. Furthermore, clay type and anionic additives could interfere with the organic cationic polymer requiring special treatment or excess organic polymer.

A preferred class of cationic polymers contain one or more repeating polymer units independently defined by and containing substantial proportions of the following repeating polymer units:

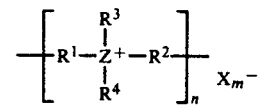

wherein $R^1$ is an aliphatic, cycloaliphatic, or aromatic radical containing 2–40 carbon atoms, or a hydrogen radical. $R^2$, $R^3$ and $R^4$ are independently radicals defined as $R^1$ and containing 0–6 carbon atoms and also 0–2 hetero atoms or radicals defined as oxygen or nitrogen. Z is a cation independently selected from nitrogen, phosphorous or sulfur. X is an anion such as a halide, nitrate, sulfate, bisulfate, carbonate, hydroxide, borate, oxide, azide, cyanide, or phosphate to balance the charge of the cations; m is an integer which, with the valence of X, is sufficient to balance the cationic charges of the polymer units; and n is an integer equal to the number of monomer or polymer units required to give a molecular weight in the range of about 400–6,000,000. The number and arrangement of R groups and heteroatoms are such that the chemical structure and valences produce a stable polymer. For example, when $R^1$ is cycloaliphatic, Z and all or a portion of the other R radicals may or may not be in the polymer chain. When Z is sulfur one of the R radicals may not be present or two or more of the R radicals may be considered to be combined.

The R or hydrocarbon radicals can be linear, branched or cycloaliphatic radicals, aromatic radicals, an unsaturated hydrocarbon radical and contain substituent radicals such as carbonyl, carboxyl, ester, halide, azo, amino, cyano, ether, mercapto, sulfonyl, nitro, keto, and the like. The R radicals can also be mono or divalent or have various connecting or terminal valences.

As indicated by the above formula, the bonds connecting the repeating polymer unit in the chain are indeterminate. These bonds can be connected through a single R group or through two different R groups or if the R groups are connected in a cyclic structure the bonds may be considered connecting through all R groups into the repeating polymer unit.

One preferred class of polymers has substantially all or major proportions of the random, regular or block repeating polymer units or combinations thereof independently defined by the formula:

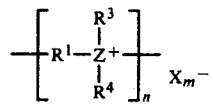

wherein $R^1$ is a divalent linear or branched chain alkyl group containing 2–40 carbon atoms, preferably 2–12 carbon atoms; $R^3$ is hydrogen or a linear or branched chain alkyl containing 1–6 carbon atoms and preferably 1–3 carbon atoms; $R^4$ is a radical defined the same as $R^3$ but can be different from $R^3$; and Z, m, and n are defined above.

Another preferred class of cationic polymers has a substantial portion of the polymer repeating units independently defined by one or more forms of the formula:

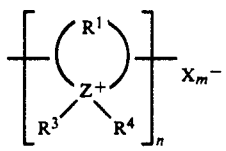

with $R^1$ being alkylene, unsaturated alkylene, substituted alkylene, or substituted unsaturated alkylene forming a cyclic hydrocarbon structure containing the cation Z defined as above and 0-3 hetero atoms. The heterocyclic hydrocarbon ring can be aliphatic, olefinic, aromatic or combinations thereof depending on the degree of unsaturation and substitutents. The substitutents can be alkyl, alkenyl, alkynyl or aryl or contain 0-6 substituent groups as defined herein. Hetero atoms include phosphorous or sulfur in regular covalent, onium or oxidized state such as phosphate or sulfone. They also include nitrogen, oxygen, hydroxyl, carbonyl, or covalent halogen but they are not directly bonded to Z. $R^3$ and $R^4$ are independently defined as above and preferably each R independently contains 1-6 carbon atoms and 0-2 hetero groups such as oxygen or nitrogen. Z, n and $X_m^-$ are independently defined as above.

Another preferred class of cationic polymer has a substantial portion of the polymer repeating units independently defined by one or more forms of the formula:

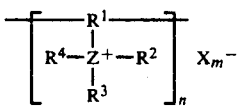

wherein $R^1$ is alkylene, alkenylene, alkynylene, arylene, or combinations of these in substantially linear or branched configurations. $R^1$ can contain 2-40 carbon atoms, 0-3 hetero atoms or groups and 0-10 substituents as defined herein. $R^2$, $R^3$, and $R^4$ are independently defined as hydrogen or alkyl, alkenyl, aryl or combinations thereof containing 1-40 carbon atoms, 0-3 hetero atoms or groups and 0-10 substituents as defined herein except that they are not in the polymer chain. The pendent linkage of $R^1$ to Z can range from a simple direct bond to a branch with several atoms between Z and the polymer chain including hetero atoms except that a hetero atom or group is not bonded directly to Z. Z, X, m and n are defined as above.

Examples of the cationic polymers include the polymers and copolymers containing substantial portions of the polymer units illustrated herein.

The organic polycationic polymers of this invention can generally be considered quaternary polymers with nitrogen or phosphorous as the quaternary or cationic atom with an aliphatic, cycloaliphatic or aromatic chain. Trivalent or tertiary sulfur can substitute for the quaternary nitrogen or phosphorous in the polymers. The cationic atom to carbon atom ratio is preferably about 1:2 to 1:36 and the molecular weight is above about 400 and preferably above about 30,000. The organic polycationic polymer is polar and therefore generally soluble in polar solvents or carrier fluids such as an aqueous media.

Preferred organic polycationic polymers of this invention can be characterized and illustrated by the following formula and examples.

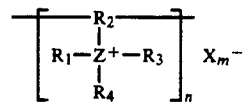

wherein $R_1$ is an organic aliphatic, cycloaliphatic, or aromatic radical containing 2-40 carbon atoms or a hydrogen radical and when $R_1$ is cycloaliphatic Z, $R_2$, $R_3$ or $R_4$ can be in the ring;

$R_2$, $R_3$ and $R_4$ are organic radicals independently defined as $R_1$ containing 0-6 carbon atoms and 0-2 oxygen or nitrogen atoms; when $R_1$ is cycloaliphatic it may or may not be in the organic polycationic polymer chain; when Z is sulfur $R_4$ is not present;

Z is a cation such as those derived from nitrogen phosphorous or sulfur;

X is an anion such as halide, nitrate, sulfate, bisulfate, carbonate, hydroxide, borate, oxide, azide, cyanide, phosphate, etc.;

n is an integer equal to the number of monomer units in the polymer required to give a molecular weight in the range of about 400-6,000,000 and preferably at least about 1,000 and more preferably above about 30,000; and m is an integer equal to the number of anions required to maintain electronic neutrality.

The organic or hydrocarbon radicals can be linear, branched or cycloaliphatic radicals, aromatic radicals, unsaturated radicals, substituted radicals or combinations thereof. The organic radicals can be homoaliphatic or heteroaliphatic, i.e., may or may not contain other atoms such as oxygen or nitrogen. Thus, the organic radicals can be substituted or unsubstituted alkyl, aryl or combinations thereof with each radical having 0-40 and preferably 0-6 carbon atoms.

The above class of organic polycationic polymers can be divided into the following preferred subclasses:

A. Alkyl Polycationic Polymers

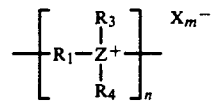

wherein $R_1$ is a divalent linear or branched chain alkyl group containing 2-40 carbon atoms, preferably in the range of 2-12 carbon atoms;

$R_2$ is contained within $R_1$;

$R_3$ is normal or branched alkyl or hydrogen containing 0-6 carbon atoms and preferably 1-3 carbon atoms;

$R_4$ is a radical defined the same as $R_3$, but it may or may not be identical to $R_3$, e.g., $R_3$=methyl and $R_4$=propyl; when Z is sulfur $R_4$ is not present;

Z is a cation such as those derived from nitrogen, phosphorous, or sulfur;

X is an anion such as halide, nitrate, sulfate, hydroxide, etc.;

n is an integer equal to the number of monomer units in the polymer required to give a molecular weight in the range of about 1,500-6,000,000; and m is an integer equal to the number of anions required to maintain electronic neutrality.

For the above subclass, preferred average molecular weight ranges up to about 3,000,000, especially above about 40,000 or 80,000 for minimum viscosity and between about 100,000–3,000,000 for higher viscosity aqueous solutions of the polymers. One preferred group of this subclass when Z is nitrogen, at least one of $R_3$ and $R_4$ is not hydrogen, methyl, ethyl or propyl.

B. Heteroaliphatic Polycationic Polymers

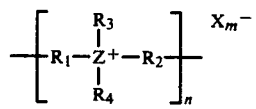

wherein $R_1$ is aryl, alkyl, arylalkyl, alkylaryl, alkenyl or combinations thereof. When $R_1$ is alkyl it contains or has appended one or more hetero atoms or groups. When $R_1$ is aryl or alkylaryl it can contain or have appended one or more hetero atoms or groups. $R_1$ can be normal-heteroalkyl or it can be branched extensively through the hetero-atoms or groups. The hetero-atoms or groups can be ethylenic (CH=CH—), acetylenic (—C≡C—), aryl, or nitrogen, phosphorous, or sulfur, in regular covalent bonding, partially oxidized, e.g., sulfone, or in the onium state, other hetero atoms or groups can be oxygen, hydroxyl, carbonyl, or covalent halogen. With the exception of ethylenic or aryl, a hetero atom or group is not bonded directly to Z.

$R_2$ is an unsubstituted alkyl or it can be defined as $R_1$ but it is not required to be identical to $R_1$. $R_2$ can be included in $R_1$.

$R_3$ can be alkyl containing 1–6 carbon atoms, hydrogen or it can be defined as a monovalent form of $R_1$ but it is not required to be identical to $R_1$.

$R_4$ can be defined as $R_3$ but it is not required to be identical to $R_3$. When Z is sulfur $R_4$ is not present. Z is a cation such as those derived from nitrogen, phosphorous or sulfur.

X is an anion such as halide, nitrate, sulfate, hydroxide, etc.

n is an integer equal to the number of monomer units in the polymer required to give a polymer with a molecular weight in the range of about 400–6,000,000.

m is an integer equal to the number of anions required to maintain electronic neutrality.

The polymer can branch through $R_1$, $R_2$, $R_3$, or $R_4$ in such manner that the main polymer chain is an arbitrary choice and $R_1$, $R_2$, $R_3$, and $R_4$ are arbitrary choices around any particular Z. A preferred molecular weight range is about 15,000–800,000.

A typical branched polymer is shown as follows:

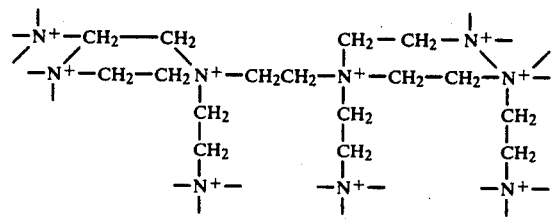

the anions are omitted for clarity.

C. Polycationic Polymers Containing Rings

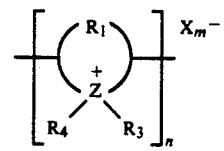

$R_1$ is alkylene, unsaturated alkylene, substituted alkylene, or substituted unsaturated alkylene forming a heterocyclic ring including Z. The heterocyclic ring can be aliphatic, olefinic or aromatic depending on the degree of unsaturation. Substituents can be alkyl, alkenyl, alkynyl, or aryl branches or substituents can be hetero atoms or hetero groups contained in the ring, appended to the ring, or appended to the branches. Hetero atoms or groups can be phosphorous or sulfur (in regular covalent, onium or oxidized state, e.g. phosphate or sulfone), nitrogen, oxygen, hydroxyl, carbonyl, or covalent halogen, a restriction being that the hetero atom or group is not bonded directly to Z.

$R_2$ is included in $R_1$.

$R_3$ is a hydrogen radical or an organic radical containing 1–6 carbon atoms and 0–2 oxygen or nitrogen atoms. In the case of certain aryl polycationic polymers, with monomer units bonded through Z and elsewhere on the aryl, $R_3$ can be absent.

$R_4$ is defined the same as $R_3$ but is not required to be identical with $R_3$. When Z is sulfur $R_4$ is absent.

Z is a cation such as those derived from nitrogen, phosphorous or sulfur.

x is an anion such as halide, nitrate, sulfate, hydroxide, etc.

n is an integer equal to the number of monomer units in the polymer required to give a polymer with a molecular weight in the range of about 400–6,000,000.

m is an integer equal to the number of anions required to maintain electronic neutrality.

Bonds containing monomer units can be through Z, other hetero atoms, $R_1$ (1 or 2 sites), or branches on $R_1$. A preferred molecular weight range is about 1,500–800,000.

D. Pendent Polycationic Polymers

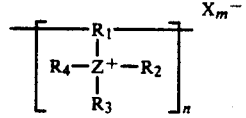

wherein $R_1$ can be alkylene, alkenylene, alkynylene, arylene, and linkages or branches of these in combinations. $R_1$ can contain hetero atoms or groups in the pendent linkage, on branch chains, on or in the polymer linkage. Hetero atoms or groups can be phosphorous or sulfur (in regular covalent, onium, or partially oxidized state, e.g., sulfone), nitrogen, oxygen, hydroxyl, carbonyl, or covalent halogen, a restriction being that the hetero atom or group is not bonded directly to Z. The pendent linkage can range from a simple bond to a branch of $R_1$ several atoms long connecting Z to the polymer chain.

$R_2$, $R_3$ and $R_4$ can be defined independently as alkyl, alkenyl, aryl or combinations thereof or can be hydrogen, except that they, unlike $R_1$, are not in the polymer chain. When $R_2$ is aryl including Z in a heterocyclic ring and/or when Z is sulfur, $R_3$ or $R_4$ may not exist.

Z is a cation such as those derived from nitrogen, phosphorous, or sulfur. In one preferred class not more than two of the three R groups can be hydrogen. In another preferred class when $R_2$ is aryl and contains nitrogen, the aryl ring has at least one substitutent or contains one other hetero atom or group.

X is an anion such as halide, nitrate, sulfate, hydroxide, etc.

n is an integer equal to the number of monomer units in the polymer required to give a polymer with a molecular weight in the range of about 400–6,000,000.

m is an integer equal to the number of anions required to maintain neutrality.

A preferred molecular weight range is about 1,500–800,000.

The following are examples of the preferred polycationic polymer classes having repeating polymer units such as those illustrated below.

(1) Where Z is sulfur, a sulfonium polymer

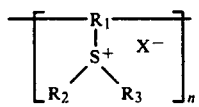

and one example is derived from the monomer $H_2C=CHCO_2CH_2CH_2S^+(CH_3)_2Cl^-$, poly(2-acryloxyethyldimethylsulfonium chloride);

$R_1$=2-acryloxyethyl, $R_2$=methyl, $R_3$=methyl, $R_4$=non-existent, and X=chloride;

The above formula and R groups show a polymer wherein the R groups are not hydrogen.

(2) where Z is phosphorous, or phosphonium polymer

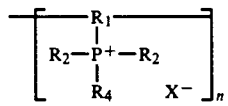

and an example monomer is

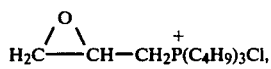

glycidyltributylphosphonium chloride; $R_1$=glycidyl, $R_2$=butyl, $R_3$=butyl, $R_4$=butyl, and X=chloride;

The above example shows a polymer wherein the cation Z is pendant and not in the polymer chain and at least three of the R groups are the same.

(3) where Z is nitrogen, quaternary ammonium polymers;

(3a) integral alkyl quaternary, example polymer:

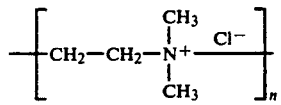

poly(dimethylethyleneammonium chloride), example polymer:

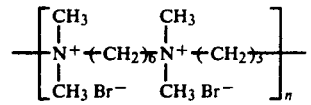

1,5-dimethyl-1,5-diazaundecamethylene polymethobromide example polymer:

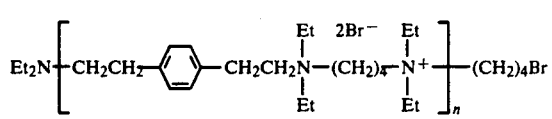

the condensation product of 1,4-bis(2-diethylaminoethyl)benzene and 1,4-dibromobutane. example polymer:

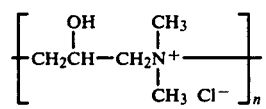

the condensation product of dimethylamine and epichlorohydrin example polymer:

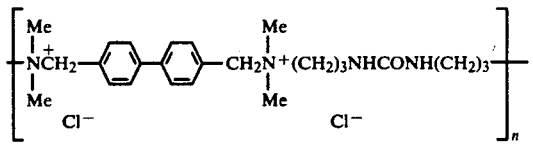

the condensation product of 1,3 bis[3-(dimethylamine)-propyl]urea and 4,4'-bis(chloromethyl) biphenyl. example polymer:

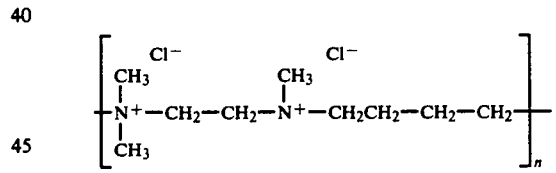

the condensation product of N,N,N',N'-tetramethylethylenediamine and 1,4-dichlorobutane;

The above examples show polymers wherein the R groups are not hydrogen; wherein the cation Z is in the polymer chain and in the second example is also in one of the R groups; wherein two of the R groups are the same and two of the R groups are different; and wherein at least two of the R groups are linear aliphatic radicals with not more than one and/or two different radicals in the polymer chain.

(3b) Integral quaternary in cyclic ring, example polymer:

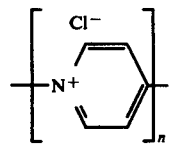

the condensation product of 4-chloropyridine;

(3c) integral alkyl, aryl quaternary, example polymer:

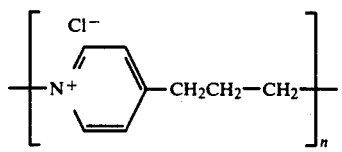

the condensation product of 1-(4-pyridyl)-3-chloropropane; another example polymer:

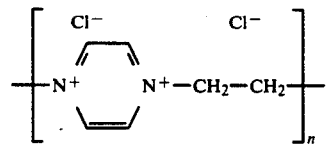

the condensation product of pyrazine and 1,2-ethylene dichloride;

The above examples show polymers with one or more cationic Z groups in the polymer chain and in an aromatic radical which is also in the polymer chain with two different R radicals which are also in the polymer chain. Thus, the examples show heterocyclic aromatic and linear R groups which are in the polymer chain.

(3d) Pendent alkyl quaternary, example polymer:

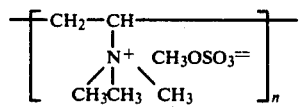

poly(vinyltrimethylammonium methylsulfate)

The above example shows a polymer with a pendent cationic Z radical and pendent R groups which are the same but different from the R group in the polymer chain; thus, Z and three of the R groups are not in the polymer chain.

(3e) Pendent quaternary on cyclic backbone, example polymer:

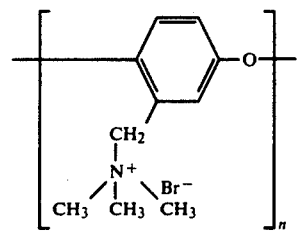

The above example shows a polymer with aromatic and hetero radicals in the polymer chain, a pendent cationic Z radical and three R groups which are aliphatic and not hydrogen or not in the polymer chain.

(3f) Pendent quaternary on carbocyclic ring, example polymer:

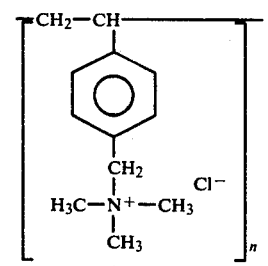

poly(vinyl-4-benzyltrimethylammonium chloride) example polymer:

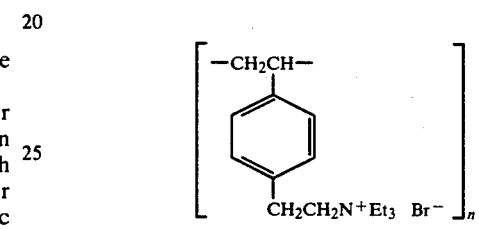

poly[4-(2-(diethylamino)ethyl)styrene]

(3g) Pendent quaternary nitrogen on polymethacrylate backbone, example polymer:

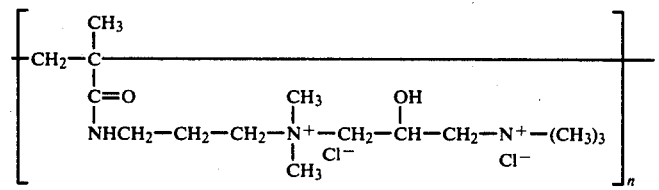

methacrylamido-4,8-dimethyl-4,8-diaza-6-hydroxynonamethylene polymethochloride. example polymer:

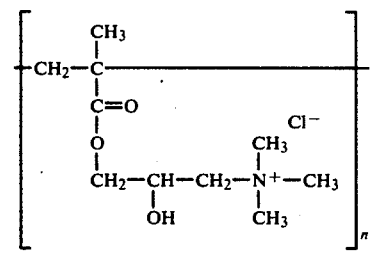

poly(3-methacryloxy-2-hydroxypropyltrimethylammonium chloride);

The above example shows different R groups with one in the polymer chain and three aliphatic R groups with one containing a cationic Z group and hetero atoms which are not in the polymer chain. another example polymer:

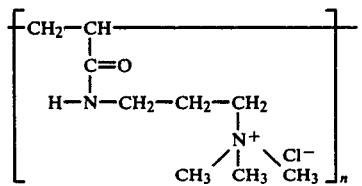

poly(acrylamido-3-propyltrimethylammonium chloride);

The above example shows a polymer with pendent R groups and cations which are not in the polymer chain, aliphatic R groups with one in the polymer chain, and a pendent group containing hetero atoms and more than one Z group.

(3h) Quaternary nitrogen in pendent heterocyclic ring, example polymers:

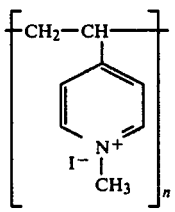

poly(4-vinyl-N-methylpyridinium iodide);

The above formula shows a polymer with a pendent hetero aromatic radical which is also a cationic radical and is not in the organic polycationic polymer chain. Another example of this class is the condensation product of epichlorohydrin and N-methylpyridine.

(3i) Heterocyclic ring containing quaternary nitrogen, example polymers:

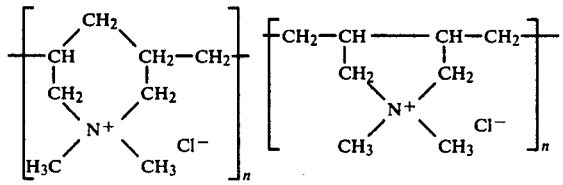

polymer of diallyldimethylammonium chloride.

The above formulae show a pendent Z cation and pendent aliphatic R groups with at least two of the R groups having the same number of carbon atoms and with two R groups having the same number of carbon atoms and being linear aliphatic radicals in the polymer chain. The formulae also show heterocyclic aliphatic groups in the polymer chain which also have pendent portions.

The above classes and subclasses of polycationic polymers can be substantially linear or branched. Examples (3a), (3b) and (3c) can be considered substantially linear polymers. Examples (1), (2), (3d), (3e), (3f), (3g), (3h) and (3i) can be considered branched. These examples show branching through at least one organic radical such as examples (1), (2), (3d), (3e), (3f), (3g), (3h) and (3i) and through a cation radical such as example (3a). Also examples (3d), (3e), (3f), (3g), (3h) and (3i) can be considered to have branching through pendent cation radicals or hetero groups. Other anions including organic or inorganic anions can be substituted for those shown such as halide, sulfate, sulfonate, alkyl sulfonate, nitrate, hydroxide, substituted alkyl, etc.

The following examples are further illustrative of various aspects of the invention and with the descriptive information herein will teach one skilled in the art how to practice the invention with numerous modifications.

EXAMPLE 1

A series of cationic organic polymers of different structural types and ranging in molecular weight from 800 to 2,600,000 were dissolved in water containing five weight percent potassium chloride. These polymers and the concentrations used are listed in Tables I and II. The ca. 380 gram (g) of dilute cationic polymer solution was used to prepare a slurry of 800 g of class H cement containing 0.6 weight percent hydroxyethyl cellulose (with a degree of substitution of 1.5). The cement slurry was mixed in a Waring blender for fifteen minutes and then placed in a Baroid high pressure filter press cell maintained at 180° F. The slurries in the cell were forced against a No. 325 U.S. Standard Sieve Series screen by an applied pressure of 1000 psig compressed nitrogen. The slurries were allowed to equilibrate to test temperature for twenty minutes prior to allowing filtrate or fluid to separate from the slurry.

The fluid removed from the slurry was collected and used in the tests summarized in Example 4.

TABLE I

Structures of Cationic Organic Polymers Used in Tests

| Test Number | Polymer | Molecular Weight | Structures |
|---|---|---|---|
| 2,3 | poly(diallyldimethylammonium chloride) | 600,000 | (structure shown) |
| 4 | polydiallyldimethylammonium chloride) | 2,600,000 | same as above |
| 5 | 1,5-dimethyl-1,5-diazaundecamethylene polymethobromide | not determined | (structure shown) |

TABLE I-continued

Structures of Cationic Organic Polymers Used in Tests

| Test Number | Polymer | Molecular Weight | Structures |
|---|---|---|---|
| 6 | poly(dimethylamine-co-epichlorohydrin) | 800 | $\left[ -\underset{\underset{CH_3}{|}}{\overset{\overset{CH_3}{|}}{N^+}} - CH_2 - \underset{Cl^-}{\overset{OH}{|}}{CHCH_2} - \right]_n$ |
| 7 | methacrylamide-4,8-dimethyl-4,8-diaza-6-hydroxynonamethylene polymethochloride | not determined | (structure with $CH_2C$ backbone, $C=O$, $NHCH_2CH_2CH_2N^+(CH_3)_2-CH_2CHCH_2N^+(CH_3)_3$, with $OH$, $Cl^-$, $Cl^-$) |

TABLE II

CATIONIC ORGANIC POLYMERS USED IN CEMENT SLURRIES.

| Test Number | Polymer[a] | Polymer Concentration in 5% Aqueous Potassium Chloride (ppm)[c] | Weight Ratio Polymer: Dry Cement[b] |
|---|---|---|---|
| 1 | None | 0 | 0 |
| 2 | poly(diallyldimethylammonium chloride) | 6555 | 0.0031 |
| 3 | poly(diallyldimethylammonium chloride) | 13096 | 0.0063 |
| 4 | poly(diallyldimethylammonium chloride) | 6680 | 0.0029 |
| 5 | 1,5-dimethyl-1,5-diazaundecamethylene polymethobromide | 6217 | 0.0029 |
| 6 | poly(dimethylamine-co-epichlorohydrin) | 4455 | 0.0021 |
| 7 | methacrylamido-4,8-dimethyl-4,8-diaza-6-hydroxynonamethylene polymethochloride | 9983 | 0.0046 |

[a]See Table I for polymer structures and molecular weights.
[b]API Class - H Cement containing 0.6% hydroxyethylcellulose (degree of substitution 1.5) as a fluid loss additive was used.
[c]ppm means parts per million parts by weight of slurry; 1 ppm = 0.0001% by wt.

EXAMPLE 2

A series of cationic organic polymers of different structural types and two widely-used fluid loss additives were used in cement slurries to compare the effects of polymeric fluid loss additives with that of the cationic organic polymers of this invention. These data are summarized in Table III.

At levels of 0.1% to 1.0% of the dry cement weight the fluid loss additives carboxymethylhydroxyethyl cellulose and poly(acrylamide-co-2-acrylamido-2-methylpropane sulfonic acid) reduced the fluid loss of the cement slurry by 88-99%. In contrast, the same concentrations of cationic organic polymers did not significantly reduce the fluid loss. Thus, the polymers of this invention function differently than the fluid loss additives.

TABLE III

FLUID LOSS FOR CEMENT SLURRIES

| TEST NUMBER | POLYMER | POLYMER TYPE | POLYMER CONCENTRATION in 5% AQUEOUS POTASSIUM CHLORIDE (ppm) | WEIGHT RATIO POLYMER: DRY CEMENT[a] | FLUID LOSS in 30 MINUTES[b] (cc) |
|---|---|---|---|---|---|
| 1 | None | — | -0- | -0- | 10,345[c] |
| 2 | Carboxymethylhydroxyethyl cellulose | polysaccharide | 21,220 | 0.0100 | 9 ± 3[d] |
| 3 | carboxymethylhydroxyethyl cellulose | polysaccharide | 10,610 | 0.0050 | 31 ± 2[e] |
| 4 | carboxymethylhydroxyethyl cellulose | polysaccharide | 5,305 | 0.0025 | 821 |
| 5 | poly(acrylamide-co-2-acrylamido-2-methylpropane sulfonic acid)[f] | anionic | 21,220 | 0.0100 | 57 |
| 6 | poly(acrylamide-co-2-acrylamido-2-methylpropane sulfonic acid)[f] | anionic | 10,610 | 0.0050 | 985 ± 42[c,e] |
| 7 | poly(acrylamide-co-2-acrylamido-2-methylpropane sulfonic acid)[f] | anionic | 5,305 | 0.0025 | 1,213[c] |
| 8 | poly(diallyldimethylammonium chloride) | cationic | 21,220 | 0.0100 | 8,162 ± 838[c,e] |
| 9 | poly(diallyldimethylammonium chloride) | cationic | 10,610 | 0.0050 | 14,516[c] |
| 10 | poly(diallyldimethylammonium chloride) | cationic | 5,305 | 0.0025 | 12,500[c] |
| 11 | poly(dimethylamine-co-epichlorohydrin) | cationic | 21,220 | 0.0100 | 15,603 ± 1,378[c,e] |
| 12 | poly(dimethylamine-co-epichlorohydrin) | cationic | 10,610 | 0.0050 | 16,657 |
| 13 | poly(dimethylamine-co-epichlorohydrin) | cationic | 5,305 | 0.0025 | 16,981 |
| 14 | 1,5-dimethyl-1,5-diazaundecamethylene | cationic | 21,220 | 0.0100 | 16,915 ± 1,126[c,e] |

TABLE III-continued
FLUID LOSS FOR CEMENT SLURRIES

| TEST NUMBER | POLYMER | POLYMER TYPE | POLYMER CONCENTRATION in 5% AQUEOUS POTASSIUM CHLORIDE (ppm) | WEIGHT RATIO POLYMER: DRY CEMENT[a] | FLUID LOSS in 30 MINUTES[b] (cc) |
|---|---|---|---|---|---|
| | polymethobromide | | | | |

[a]API Class H. Cement
[b]At a temperature of 180° F. and an applied pressure of 1000 psig.
[c]Calculated value.
[d]Average of two determinations ± average deviation.
[e]Average of three determinations ± average deviation.
[f]85 weight percent acrylamide and 15 weight percent 2-acrylamido-2-methylpropane sulfonic acid.

EXAMPLE 3

The dimensions of the Teflon TM polymer sleeved test chambers were 2.32 cm inside diameter; 4.23 cm² inside cross-sectional area, 8.04 cm sand pack column height, 33.09 cm³ sand pack column volume, and porosity of about 30%.

The Teflon TM sleeved chambers were packed (from bottom to top) with 10 g of Oklahoma No. 1 sand (70-170 U.S. mesh); 60 g of a mixture of 85.0% Oklahoma No. 1 sand (70-170 U.S. mesh), 10.0% silica, (ca. 270 U.S. mesh), and 5.0% Wyoming bentonite; 10 g Oklahoma No. 1 sand (70-170 U.S. mesh); and 25 g 20-40 U.S. mesh sand. Fluids were forced through these columns at ambient temperature (72° F.) using an applied pressure of 50 psig.

A standard laboratory brine was prepared by mixing 7.5 weight percent sodium chloride, 0.55 weight percent calcium chloride, 0.42 weight percent magnesium chloride hexahydrate, and 91.53 weight percent fresh water. This brine was flow through each test column until a stable flow rate was achieved. This initial brine flow rate was defined as 100.0%. Each column was then treated with 100 cc of a fluid collected from a cement slurry as described in Example 1. The results of the subsequent flow rate experiments are summarized in Table IV. The flow rates are expressed as a percentage of the initial brine flow rate.

The test equipment described in Example 2 was used in the experiments summarized in Table IV. The same experimental conditions and procedures were employed.

Examination of the results of Tests 2 and 6 summarized in Table IV indicate that the effluents from the cement slurries containing the fluid loss additives carboxymethylhydroxyethyl cellulose and, poly(acrylamide-co-2-acrylamido-2-methylpropane sulfonic acid) did not stabilize clays. The flow of brine through a clayey test sand treated with the poly(acrylamide-co-2-acrylamido-2-methylpropane sulfonic acid)treated cement effluent was only 17.4% of the initial flow rate while fresh water rapidly plugged the test column. The carboxymethylhydroxyethyl cellulose treated cement effluent rapidly plugged the test column despite containing 5% potassium chloride. Thus, the effluents from cement slurries containing only fluid loss additive did not stabilize clays and greatly reduced sand pack permeability.

In contrast, the presence of the same concentration of cationic organic polymers poly(diallyldimethylammonium chloride), poly(dimethylamine-co-epichlorohydrin) or 1,5-dimethyl-1,5-diazaundecamethylene polymethobromide in the cement slurry produced effluents which did not damage the permeability of clayey sand packs and stabilized the clays as indicated by flow rate data from tests 9, 12, and 14 summarized in Table IV. The high flow rates even after exposure of the clayey test sands to fresh water indicated that substantial treatment of the clays by cationic organic polymer and consequent clay stabilization had occurred.

TABLE IV
FLOW RATES OF CLAYEY SAND COLUMNS TREATED WITH CEMENT EFFLUENTS

| Test Number[a] | Polymer | Initial Brine | Brine | Fresh Water | 15% HCl | Fresh Water |
|---|---|---|---|---|---|---|
| 6 | poly(acrylamide-co-2-acrylamido-methylpropane sulfonic acid) | 100.0% | 17.4% | 1.8%[d] | — | — |
| 2 | carboxymethylhydroxyethyl cellulose | 100.0% | [c] | — | — | — |
| 9 | poly(diallyldimethylammonium chloride) | 100.0% | 112.0% | 156.5% | 119.6% | 133.6% |
| 12 | poly(dimethylamine-co-epichlorohydrin) | 100.0% | 110.5% | 135.7% | 102.5% | 126.0% |
| 14 | 1,5-dimethyl-1,5-diazaundecamethylene polymethobromide | 100.0% | 118.2% | 144.2% | 63.5% | 137.0% |

Relative Flow Rates After Treatment[b]

[a]See Example 3 for experiment details. Test numbers correspond to the test numbers in Example 3 and Table III.
[b]The treatment was 100.0 cc of the fluid removed from the cement slurries in Examples 1 and 2. This fluid was filtered through a 5 micron filter paper before injection onto the test column.
[c]The column plugged after injection of only 71 cc treatment solution.
[d]Initial value, the column plugged after injection of only 10 cc fresh water.

EXAMPLE 4

The fluids removed from the slurries described in Example 1 were used to treat clayey sand columns as described in Example 3 and the results are given in Table V.

In Test 1, (Table V) the cement hydration fluid contained no polymer. After the column was treated with 100 cc of the fluid lost from the cement, it rapidly became plugged during treatment with the fluid lost from the cement slurry.

In Test 2 (Table V) a 6555 ppm solution of poly (diallyldimethylammonium chloride) was used to hydrate the cement. The brine flow rate after the column was treated with 100 cc of fluid lost from the cement was 47.1% of the initial brine flow rate. This brine was followed by injection of fresh water. The fresh water flow rate was 56.7% of the initial brine flow rate. These results indicated that substantial clay stabilization had occurred. The column was then treated with 400 cc of aqueous hydrochloric acid. The flow rate of fresh water injected after this acid solution was 182.5% of the initial brine flow rate indicating that the polymer was stable to acid treatment. The increased flow rate relative to the initial brine flow rate was caused by acid dissolution of fine particles in the test column.

The same polymer was used in Test 3. The polymer concentration was increased from 6555 ppm to 13096 ppm in the fluid used to hydrate the cement. The weight ratio of polymer to cement was increased from 0.31% to 0.63% (see Table II). The effect of this increase can clearly be seen in the brine and fresh water flow rates after test column treatment with 100 cc of cement effluent. The brine flow rate was 61.2% of the initial brine flow rate (as compared to 47.1% in Test 2) while the fresh water flow rate was also 61.2% of the initial brine flow rate (as compared to 56.7% in Test 2). The treatment was again stable to exposure to 15% hydrochloric acid; the flow rate after acidizing was 160.0% of the initial brine flow rate.

A higher molecular weight poly(diallyldimethylammonium chloride) 2,600,000 vs. 600,000 in Tests 2 and 3, was used in Test 4. The polymer concentration in the fluid used to hydrate the cement was 6680 ppm, nearly the same as in Test 2. After the test column was treated with 100 cc of the fluid lost from the cement slurry, the brine flow rate was 25.6% and the fresh water flow rate was 22.3% of the initial brine flow rate. After the column was acidized, the fresh water flow rate was 78.9% of the original brine flow rate. These results indicated that this high molecular weight polymer did substantially stabilize the clays. Comparison of Tests 2 and 4 indicated that the higher molecular weight poly(diallyldimethylammonium chloride) was less effective.

In Tests 2, 3, 4, the quaternary nitrogen atom was in a heterocyclic ring (see Table I). In Test 5 using 1,5-dimethyl-1,5-diazaundecamethylene polymethobromide, the quarternary nitrogen atom was in the polymer backbone. Polymer concentration in the fluid used to hydrate cement was 6217 ppm. Again the total amount of polymer used was ca. 0.3% of the weight of the cement (see Table II). After treatment of the test column with 100 cc of cement effluent (see Table V) the brine flow rate was 41.2% and the fresh water flow rate 104.0% of the initial brine flow rate indicating substantial clay stabilization had occurred. The flow rate remained substantial after the test column was acidized.

The polymer used in Test 6, poly(dimethylamine-co-epichlorohydrin) also contained quaternary nitrogen atoms in the polymer backbone (see Table I) but also contained another heteroatom, oxygen in the form of hydroxyl groups, and was of quite low molecular weight, only 800. The polymer concentration in the fluid used to hydrate the cement was 4,455 ppm. The total amount of polymer used was 0.2% of the weight of the dry cement (see Table II). After treatment of a test column with 100 cc of the fluid lost from the cement, the brine flow rate was 47.1% and the fresh water flow rate was 51.8% of the original flow rate. After the column was acidized, the fresh water flow rate was 103.5% of the initial brine flow rate.

The polymer used in Test 7, methacrylamido-4,8-dimethyl-4,8-diaza-6-hydroxynonamethylene polymethochloride, contained quaternary nitrogen atoms at the end of a long pendant chain (see structure in Table I). The polymer concentration in the fluid used to treat the cement was 9983 ppm (see Table II). After a test column was treated with 100 cc of the fluid lost from the cement, the brine flow rate was 20.9% and the fresh water flow rate was 28.3% of the initial brine flow rate prior to treatment. These flow rates indicate that significant clay stabilization had occurred. After the column was treated with 400 cc of 15% hydrochloric, the fresh water flow rate was 98% of the original brine flow rate.

TABLE V

FLOW RATES OF CLAYEY SAND COLUMNS TREATED WITH CEMENT EFFLUENTS

| Test[b] Number | Polymer | Initial Brine | Brine | Fresh Water | 15% HCl | Fresh Water |
|---|---|---|---|---|---|---|
| 1 | None | 100.0% | 0% | — | — | — |
| 2 | poly(diallyldimethylammonium chloride) | 100.0% | 47.1% | 56.7% | 152.6% | 182.5% |
| 3 | poly(diallyldimethylammonium chloride) | 100.0% | 61.2% | 61.2% | 198.7% | 160.0% |
| 4 | poly(diallyldimethylammonium chloride) | 100.0% | 25.6% | 22.3% | 75.9% | 78.9% |
| 5 | 1,5-dimethyl-1,5-diazaundecamethylene polymethobromide | 100.0% | 41.2% | 104.0% | 51.7% | 68.4% |
| 6 | poly(dimethylamine-co-epichlorohydrin) | 100.0% | 47.1% | 51.8% | 77.6% | 103.5% |
| 7 | methacrylamide-4,8-dimethyl-4,8-diaza-6-hydroxynon- | 100.0% | 20.9% | 28.3% | 82.4% 98.0% | |

Relative Flow Rates After Treatment[a]

[a]The treatment was 100.0 cc of the fluid removed from the cement slurries in Example 1. This fluid was filtered through a 5 micron filter paper before injection into the test column.
[b]The test numbers correspond to the test numbers in Tables 1 and 2.

I claim:

1. A process for filling a zone adjacent to a permeable formation containing clays and treating said clays with a clay stabilizing organic cationic polymer comprising:
   mixing an aqueous inorganic cement slurry containing a water soluble clay stabilizing organic cationic polymer, said polymer having a molecular weight of about 400–6,000,000 and containing cationic groups of nitrogen, sulfur, or phosphorous or combinations thereof, wherein said polymer is added to said slurry in an effective concentration to produce a filtrate containing polymer in an amount of at least about 0.1% by weight of filtrate; and
   introducing said aqueous cement slurry into said zone.

2. A process of claim 1 wherein the average molecular weight of the organic polymer is between about 100,000–3,000,000.

3. A process of claim 1 wherein the organic cationic polymer comprises polymer units derived from at least one of the following units: 2-acryloxyethyl dimethyl sulfonium; glycidyltributylphosphonium; dimethylethyleneammonium; 1,5-dimethyl-1,5-diazaundecamethylene; 1,4-bis(2-diethylaminoethyl)benzene; 1,4-dibromobutane; dimethylamine; epichlorohydrin; 1,3-bis[3-(dimethylamine)propyl]urea; 4,4'-bis(-chloromethyl)biphenyl; N,N,N',N'-tetramethylethylene diamine; 1,4-dichlorobutane; 4-chloropyridine; 1-(4-pyridyl)-3-chloropropane; pyrazine; 1,2-ethylene dichloride; vinyltrimethylammonium; vinyl-4-benzyltrimethylammonium; 4-(2(diethylamino)ethyl) styrene; methacrylate; methacrylamido-4,8-dimethyl-4,8-diaza-6-hydroxynonamethylene; 3-methacryloxy-2-hydroxypropyltrimethylammonium; acrylamido-3-propyltrimethylammonium; 4-vinyl-N-methylpyridinium; N-methylpyridine; and diallyldimethylammonium.

4. A process of claim 1 wherein the organic cationic polymer is a substantially linear polymer with a major portion of the polymer units defined by the formula:

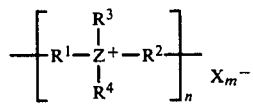

Wherein:
$R^1$ is an aliphatic, cycloaliphatic, or aromatic radical containing 2–40 carbon atoms, or a hydrogen radical;
$R^2$, $R^3$ and $R^4$ are independently radicals defined as $R^1$ and containing 0–6 carbon atoms and 0–2 hetero atoms or radicals comprising oxygen or nitrogen;
Z is a cation independently selected from nitrogen, phosphorous or sulfur;
X is an anion;
m is an integer which, with the valence of X, is sufficient to balance the cationic charges of the polymer units;
n is an integer equal to the number of monomer or polymer units required to give a molecular weight in the range of about 400–6,000,000;
and wherein the number and arrangement of R groups and heteroatoms are such that the chemical structure and valences produce a stable polymer.

5. A process of claim 4 wherein the molecular weight of said organic polymer is at least about 1,000 and said inorganic cement solids comprise a significant amount of portland cement.

6. A process of claim 1 wherein the organic cationic polymer is a substantially linear polymer with a major portion of the polymer units defined by the formula:

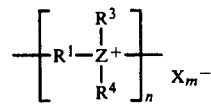

wherein:
$R^1$ is a divalent alkyl group containing 2–40 carbon atoms;
$R^3$ is substantially linear alkyl, branched alkyl or hydrogen containing 0–6 carbon atoms;
$R^4$ is a radical defined the same as $R^3$ but independently of $R^3$; provided when Z is sulfur $R^4$ is not present;
Z is a cation comprising one derived from nitrogen, phosphorous, or sulfur;
X is an anion;
n is an integer equal to the number of monomer units in the polymer required to give a molecular weight in the range of about 400–6,000,000; and
m is an integer equal to the number of anions required to maintain electronic neutrality.

7. A process of claim 6 wherein the molecular weight of said organic polymer is at least about 1,000 and said inorganic cement solids comprise a significant amount of portland cement.

8. A process of claim 1 where in the organic cationic polymer is a substantially linear polymer with a major portion of the polymer units defined by the formula:

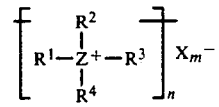

wherein:
$R^1$ is an organic aliphatic, cycloaliphatic, or aromatic radical containing 2–40 carbon atoms or a hydrogen radical; provided when $R^1$ is cycloaliphatic one or more of Z, $R^2$, $R^3$ or $R^4$ are in the ring; $R^2$, $R^3$ and $R^4$ are organic radicals independently defined as $R^1$ containing 0–6 carbon atoms and 0–2 hetero atoms comprising oxygen or nitrogen atoms;
provided when $R^1$ is cycloaliphatic it comprises a radical in the polymer chain of a pendent chain;
when Z is sulfur $R^4$ is not present;
Z is a cation comprising one derived from nitrogen phosphorous or sulfur;
X is an anion;
n is an integer equal to the number of monomer units in the polymer required to give a molecular weight in the range of about 400–6,000,000;
and m is an integer equal to the number of anions required to maintain electronic neutrality.

9. A process of claim 8 wherein the molecular weight of said organic polymer is at least about 1,000 and said inorganic cement solids comprise a significant amount of portland cement.

10. A process of claim 1 wherein the organic cationic polymer is a substantially linear polymer with a major portion of the polymer units defined by the formula:

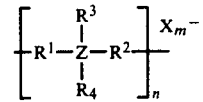

wherein:
$R^1$ is aryl, alkyl, arylalkyl, alkylaryl, alkenyl or combinations thereof;
wherein when $R^1$ is alkyl, alkylaryl or aryl it contains or has appended 0–2 hetero groups comprising ethylenic, acetylenic, aryl, oxygen, hydroxyl, carbonyl, covalent halogen or nitrogen, phosphorous, or sulfur, in regular covalent bonding, partially oxidized, sulfone, or in the onium state; provided however with the exception of ethylenic or aryl, a hetero group is not bonded directly to Z;
$R^2$ is an alkyl, non-existent or it is independently defined as $R^1$;
$R^3$ is alkyl containing 1–6 carbon atoms, hydrogen or it is independently defined as a monovalent form of $R^1$;

$R^4$ is independently defined as $R^3$; provided however, when Z is sulfur $R^4$ is not present;

Z is a cation comprising those derived from nitrogen, phosphorous or sulfur;

X is an anion;

n is an integer equal to the number of monomer units in the polymer required to give a polymer with a molecular weight in the range of about 400–6,000,000; and m is an integer equal to the number of anions required to maintain electronic neutrality.

11. A process of claim 10 wherein the molecular weight of said organic polymer is at least about 1,000 and said inorganic cement solids comprise a significant amount of portland cement.

12. A process of claim 1 wherein the organic cationic polymer is a substantially linear polymer with a major portion of the polymer units defined by the formula:

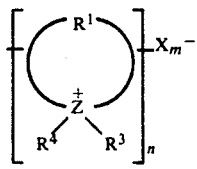

wherein:

$R^1$ is alkylene, unsaturated alkylene, substituted alkylene, or substituted unsaturated alkylene forming a heterocyclic ring including Z and the heterocyclic ring can be aliphatic, olefinic or aromatic depending on the degree of unsaturation; wherein substituents comprise alkyl, alkenyl, alkynyl, aryl or hetero groups contained in the ring, appended to the ring, or appended to the branches; wherein hetero comprise nitrogen, oxygen, hydroxyl, carbonyl, covalent halogen, phosphorous or sulfur, in regular covalent, onium or oxidized state, e.g. phosphate or sulfone; provided however, that the hetero group is not bonded directly to Z;

$R^3$ is non-existent, a hydrogen radical or an organic radical containing 1–6 carbon atoms and 0–2 oxygen or nitrogen atoms;

$R^4$ is independently defined the same as $R^3$; however, when Z is sulfur $R^4$ is absent;

Z is a cation comprising those derived from nitrogen, phosphorus or sulfur;

X is an anion;

n is an integer equal to the number of monomer units in the polymer required to give a polymer with a molecular weight in the range of about 400–6,000,000; and m is an integer equal to the number of anions required to maintain electronic neutrality.

13. A process of claim 12 wherein the molecular weight of said organic polymer is at least about 1,000 and said inorganic cement solids comprise a significant amount of portland cement.

14. A process for treating a subterranean clay-containing formation with an aqueous cement composition wherein damage to the formation permability as a result of clay swelling or disintegration or migration of fine particles caused by contact with aqueous filtrate fluids from the cement composition is minimized comprising the steps of:

adding a water soluble clay stabilizing organic cationic polymer to said aqueous cement composition in an amount such that the aqueous filtrate fluids from said composition contain said polymer in an amount at least about 0.1% by weight of said filtrate, said organic cationic polymer being selected from the group consisting of polymers and mixtures of polymers containing substantial portions of repeating polymer units defined by the formula:

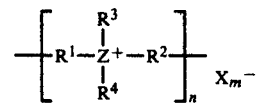

wherein:

$R^1$ is an aliphatic, cycloaliphatic, or aromatic radical containing 1–40 carbon atoms;

$R^2$, $R^3$ and $R^4$ are independently radicals defined as $R^1$ and containing 0–6 carbon atoms and 0–2 hetero atoms or radicals comprising oxygen or nitrogen;

Z is a cation independently selected from nitrogen, phosphorous or sulfur;

X is an anion;

m is an integer which, with the valence of X, is sufficient to balance the cationic charges of the polymer units;

n is an integer equal to the number of monomer or polymer units required to give a molecular weight in the range of about 400–6,000,000;

and wherein the number and arrangement of R groups and heteroatoms are such that the chemical structure and valences produce a stable polymer; and introducing said cement composition into said formation.

15. The process of claim 14 wherein said organic cationic polymer is a substantially linear polymer with a major portion of the polymer units defined by the formula:

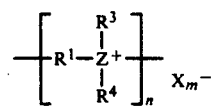

wherein:

$R^1$ is a divalent alkyl group containing 2–40 carbon atoms;

$R^3$ is substantially linear alkyl, branched alkyl or hydrogen containing 0–6 carbon atoms;

$R^4$ is a radical defined the same as $R^3$ but independently of $R^3$; provided when Z is sulfur $R^4$ is not present;

Z is a cation comprising one derived from nitrogen, phosphorous or sulfur;

X is an anion;

n is an integer equal to the number of monomer units in the polymer required to give a molecular weight in the range of about 1500–6,000,000; and m is an integer equal to the number of anions required to maintain electronic neutrality.

16. The process of claim 14 wherein said organic cationic polymer is a substantially linear polymer with a major portion of the polymer units defined by the formula:

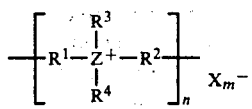

wherein:

$R^1$ is aryl, alkyl, arylalkyl, alkylaryl, alkenyl or combinations thereof;

wherein when $R^1$ is alkyl, alkylaryl or aryl is contains or has appended 0-2 hetero groups comprising ethylenic, acetylenic, aryl, oxygen, hydroxyl, carbonyl, covalent halogen or nitrogen, phosphorous, or sulfur, in regular covalent bonding, partially oxidized, sulfone, or in the onium state; provided however with the exception of ethylenic or aryl, a hetero group is not bonded directly to Z;

$R^2$ is an alkyl, non-existent or it is independently defined as $R^1$;

$R^3$ is alkyl containing 1-6 carbon atoms, or it is independently defined as a monovalent form of $R^1$;

$R^4$ is independently defined as $R^3$; provided however, when Z is sulfur $R^4$ is not present;

Z is a cation comprising those derived from nitrogen, phosphorous or sulfur;

X is an anion;

n is an integer equal to the number of monomer units in the polymer required to give a polymer with a molecular weight in the range of about 400-6,000,000; and m is an integer equal to the number of anions required to maintain electronic neutrality.

17. The process of claim 14 wherein said repeating polymer units have the formula:

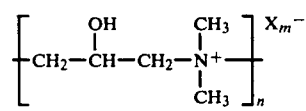

18. The process of claim 17 wherein n is an integer such that the molecular weight of the polymer is in the range of about 400-10,000.

19. The process of claim 14 wherein said repeating polymer units are defined by the formula:

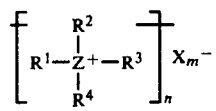

wherein:

$R^1$ is an organic aliphatic, cycloaliphatic, or aromatic radical containing 1-40 carbon atoms; provided when $R^1$ is cycloaliphatic one or more of Z, $R^2$, $R^3$ or $R^4$ are in the ring; $R^2$, $R^3$ and $R^4$ are organic radicals independently defined as $R^1$ containing 0-6 carbon atoms and 0-2 hetero atoms comprising oxygen or nitrogen atoms;

provided when $R^1$ is cycloaliphatic it comprises a radical in the polymer chain of a pendent chain;

when Z is sulfur $R^4$ is not present;

Z is a cation comprising one derived from nitrogen phosphorous or sulfur;

X is an anion;

n is an integer equal to the number of monomer units in the polymer required to give a molecular weight in the range of about 400-6,000,000; and m is an integer equal to the number of anions required to maintain electronic neutrality.

20. The process of claim 19 wherein said repeating polymer units are of the formula:

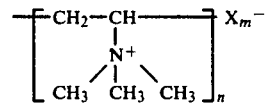

21. The process of claim 21 wherein said repeating polymer units are of the formula:

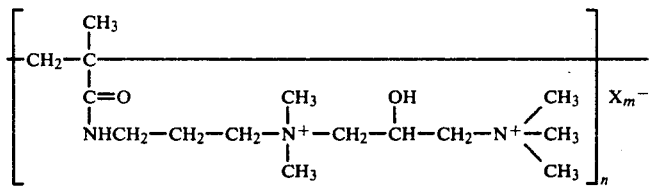

22. The process of claim 19 wherein said repeating polymer units are of the formula:

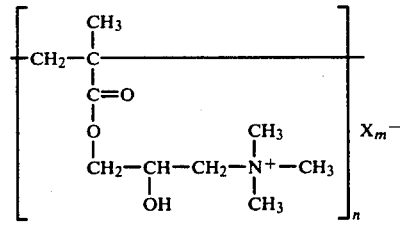

23. The process of claim 14 wherein the repeating polymer units are defined by the formula:

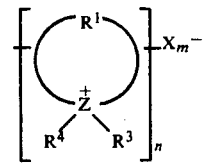

wherein:

$R^1$ is alkylene, unsaturated alkylene, substituted alkylene, or substituted unsaturated alkylene forming a heterocyclic ring including Z and the heterocyclic ring can be aliphatic, olefinic or aromatic depending on the degree of unsaturation; wherein substituents comprise alkyl, alkenyl, alkynyl, aryl or hetero groups contained in the ring, appended to the ring, or appended to the branches; wherein hetero comprise nitrogen, oxygen, hydroxyl, carbonyl, covalent halogen, phosphorous or sulfur, in regular covalent, onium or oxidized state, e.g., phosphate or sulfone; provided however, that the hetero group is no bonded directly to Z;

$R^3$ is non-existent, a hydrogen radical or an organic radical containing 1-6 atoms and 0-2 oxygen or nitrogen atoms;

$R^4$ is independently defined the same as $R^3$; however, when Z is sulfur $R^4$ is absent;

Z is a cation comprising those derived from nitrogen, phosphorous or sulfur;

X is an anion;

n is an integer equal to the number of monomer units in the polymer required to give a polymer with a molecular weight in the range of about 400–6,000,000; and m is an integer equal to the number of anions required to maintain electronic neutrality.

24. The process of claim 23 wherein said repeating polymer units are of the following formula:

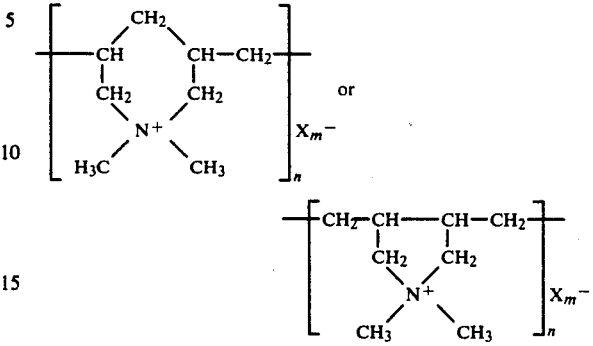

* * * * *

UNITED STATES PATENT AND TRADEMARK OFFICE
CERTIFICATE OF CORRECTION

PATENT NO. : 4,393,939

DATED : July 19, 1983

INVENTOR(S) : Charles W. Smith & John K. Borchardt

It is certified that error appears in the above-identified patent and that said Letters Patent is hereby corrected as shown below:

In Column 12, line 41 through line 46, delete

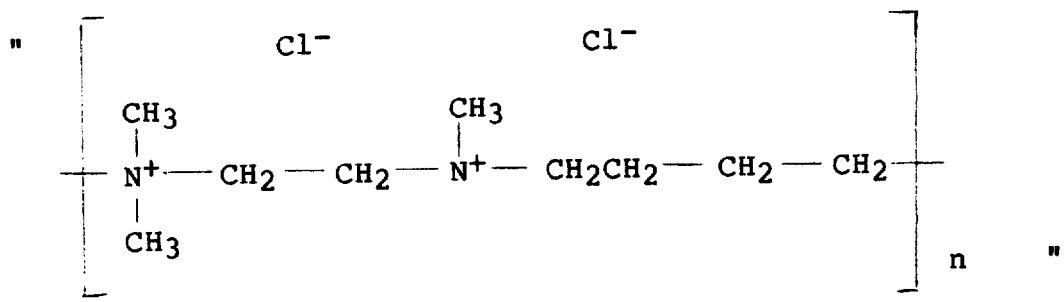

and insert

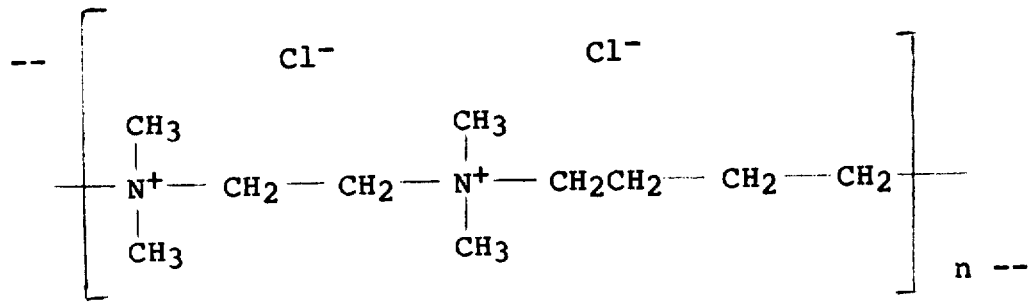

therefor.

UNITED STATES PATENT AND TRADEMARK OFFICE
CERTIFICATE OF CORRECTION

PATENT NO. : 4,393,939

DATED : July 19, 1983

INVENTOR(S) : Charles W. Smith & John K. Borchardt

It is certified that error appears in the above-identified patent and that said Letters Patent is hereby corrected as shown below:

In Column 14, line 6 through line 16, delete

"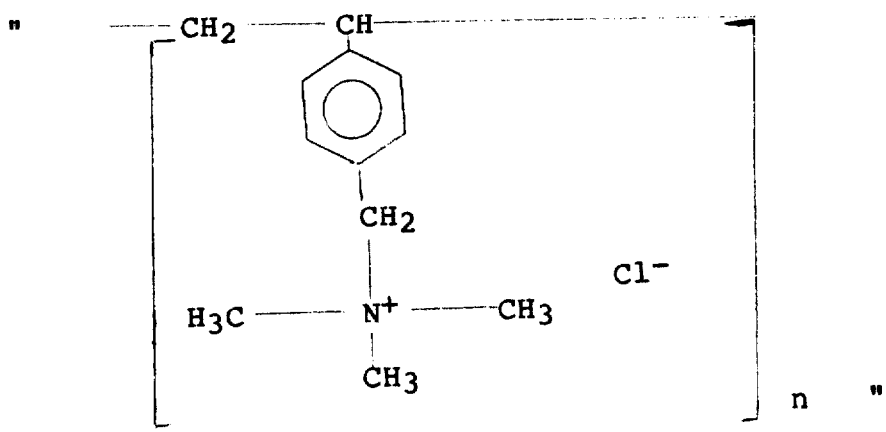"

and insert

--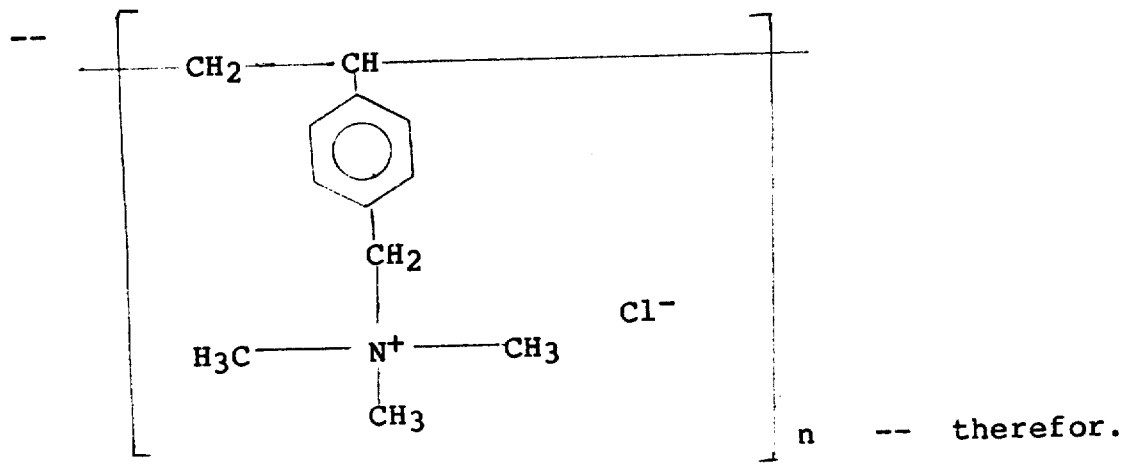-- therefor.

UNITED STATES PATENT AND TRADEMARK OFFICE
CERTIFICATE OF CORRECTION

PATENT NO. : 4,393,939

DATED : July 19, 1983

INVENTOR(S) : Charles W. Smith & John K. Borchardt

It is certified that error appears in the above-identified patent and that said Letters Patent is hereby corrected as shown below:

In Column 19, line 16, delete "TeflonTM" and insert --Teflon™-- therefor. (The TM should appear as a superscript and represents that the name is a trademark.)

In Column 19, line 21, delete "TeflonTM" and insert --Teflon™-- therefor. (The TM should appear as a superscript and represents that the name is a trademark.)

In Columns 21 and 22, Table V, Test No. 7, under the column heading Polymer a line of type was omitted. Please delete under the column heading Polymer of Test No. 7

"methacrylamide-4,8-dimethyl-4,8-diaza-6-hydroxynon-" and insert

--methacrylamide-4,8-dimethyl-4,8-diaza-6-hydroxynon amethylene polymethochloride-- therefor.

In Columns 21 and 22, Table V, Test No. 7, 98.0% has been misplaced and should appear under the column heading Fresh Water.

Signed and Sealed this

Twenty-fourth Day of July 1984

[SEAL]

Attest:

GERALD J. MOSSINGHOFF

Attesting Officer    Commissioner of Patents and Trademarks